United States Patent
Honijk

(10) Patent No.: US 12,455,012 B2
(45) Date of Patent: Oct. 28, 2025

(54) INCREASING WEAR RESISTANCE OF A WASTEGATE VALVE

(71) Applicant: MITSUBISHI HEAVY INDUSTRIES ENGINE & TURBOCHARGER, LTD., Kanagawa (JP)

(72) Inventor: Rick Honijk, Almere (NL)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/687,730

(22) PCT Filed: Sep. 13, 2022

(86) PCT No.: PCT/IB2022/058614
§ 371 (c)(1),
(2) Date: Feb. 28, 2024

(87) PCT Pub. No.: WO2023/042069
PCT Pub. Date: Mar. 23, 2023

(65) Prior Publication Data
US 2024/0353009 A1  Oct. 24, 2024

(30) Foreign Application Priority Data

Sep. 15, 2021 (WO) .................. PCT/IB2021/058390

(51) Int. Cl.
*F16K 1/20* (2006.01)
*F02B 37/18* (2006.01)
(52) U.S. Cl.
CPC .......... *F16K 1/2042* (2013.01); *F02B 37/183* (2013.01); *F16K 1/2014* (2013.01)
(58) Field of Classification Search
CPC ..... F16K 1/2042; F16K 1/2014; F02B 37/183
See application file for complete search history.

(56) References Cited

U.S. PATENT DOCUMENTS

2015/0292394 A1   10/2015   Uibelhoer et al.
2016/0341109 A1   11/2016   Lummer et al.
(Continued)

FOREIGN PATENT DOCUMENTS

CN          109268131 A       1/2019
DE    20 2010 005 747 U1      9/2010
(Continued)

OTHER PUBLICATIONS

International Search Report for PCT/IB2022/058614 (PCT/ISA/210) mailed on Oct. 31, 2022.
(Continued)

*Primary Examiner* — John Bastianelli
(74) *Attorney, Agent, or Firm* — Birch, Stewart, Kolasch & Birch, LLP

(57) ABSTRACT

In the technical field of wastegate valves comprising a functional assembly of a body member (20) and an actuable member (30), measures are proposed to limit axial wear of the body member (20) and the actuable member (30) on each other as a result of engine vibration and pulsation. One of the measures involves a design of the wastegate valve in which at least one of surfaces (24, 33) of the body member (20) and the actuable member (30) facing each other in an axial direction (A) of the wastegate valve is provided with at least one elevated portion (26, 35) delimited by at least one recessed portion (27, 36) in at least a tangential direction (T) about the axial direction (A). In this way, one or more spaces for receiving tiny wear particles from the interface between the body member (20) and the actuable member (30) are obtained.

11 Claims, 7 Drawing Sheets

(56) References Cited

U.S. PATENT DOCUMENTS

| | | |
|---|---|---|
| 2019/0093549 A1* | 3/2019 | Sadamitsu ............ F02B 37/183 |
| 2019/0136752 A1 | 5/2019 | Burmester et al. |
| 2020/0141309 A1 | 5/2020 | Reif et al. |
| 2021/0033022 A1* | 2/2021 | Ebert ...................... F02B 37/18 |
| 2021/0054779 A1 | 2/2021 | Purdey |
| 2021/0239036 A1* | 8/2021 | Penth .................... F02B 37/186 |

FOREIGN PATENT DOCUMENTS

| | | |
|---|---|---|
| DE | 10 2015 011 256 A1 | 3/2016 |
| DE | 10 2016 204 076 A1 | 11/2016 |
| DE | 10 2017 202 132 A1 | 8/2018 |
| DE | 10 2017 202 137 A1 | 8/2018 |
| JP | 2013-213565 A | 10/2013 |
| JP | 2020-527663 A | 9/2020 |
| WO | WO 2013/098884 A1 | 7/2013 |
| WO | WO2019/190662 A1 | 10/2019 |

OTHER PUBLICATIONS

Written Opinion of the International Searching Authority for PCT/IB2022/058614 (PCT/ISA/237) mailed on Oct. 31, 2022.

\* cited by examiner

INCREASING WEAR RESISTANCE OF A WASTEGATE VALVE

FIELD OF THE INVENTION

In the first place, the present invention relates to a wastegate valve comprising a functional assembly of a body member and an actuable member, wherein the body member has a sealing portion that is configured to rest on a seat for the wastegate valve in a closing position of the wastegate valve, and wherein the actuable member is configured to provide an engagement area of the functional assembly and to thereby enable setting of the position of the wastegate valve through manipulation of the actuable member.

In the second place, the present invention relates to a wastegate system of a turbocharger including a turbine and a compressor, and also an exhaust gas inlet, wherein the wastegate system comprises a bypass duct bypassing the turbine downstream of the exhaust gas inlet, which bypass duct is openable and closeable through a wastegate valve as described here before.

In the third place, the present invention relates to a turbocharger that is equipped with a wastegate system as described here before.

BACKGROUND OF THE INVENTION

A well-known example of a field in which wastegate valves are applied is the field of exhaust gas turbochargers. In practical embodiments of a turbocharger which compresses intake air for an engine such as an internal combustion engine, a wastegate valve is applied to prevent a supercharging pressure of the intake air from increasing excessively due to increasing pressure of the exhaust gas. In view thereof, the wastegate valve is configured to open and close an exhaust gas bypass path through which part of incoming exhaust gas can be diverted directly into an exhaust gas outlet path so that energy of the exhaust gas supplied to a turbine rotor of the turbocharger can be limited.

Embodiments of a wastegate valve in which the wastegate valve comprises a functional assembly of a body member and an actuable member, wherein the body member has a sealing portion that is configured to rest on a seat for the wastegate valve in a closing position of the wastegate valve, and wherein the actuable member is configured to provide an engagement area of the functional assembly and to thereby enable setting of the position of the wastegate valve through manipulation of the actuable member, are known. In this respect, it is noted that one of numerous examples of a known wastegate valve is found in WO 2013/098884 A1. In particular, WO 2013/098884 A1 discloses a wastegate valve comprising: a) a valving element which opens and closes an exhaust gas bypass path, the exhaust gas bypass path extracting a part of exhaust gas flow from an inlet side of an exhaust gas path of a turbine housing and feeding the part of the exhaust gas to an exhaust gas outlet path, b) a valve stem which stands upright from the valving element, c) an operating lever which has one end formed with an insertion hole where the valve stem is inserted with play and another end to which rotational force is applied, d) a support plate which is provided on one end of the valve stem opposite to the other end which is inserted through the insertion hole, and e) a damping member which is provided between the support plate and the operating lever in an axial direction of the valve stem to suppress vibration of the valving element. Vibration of the valving element takes place in response to engine vibration and pulsation. On the basis of the vibration suppression measures, the sealing performance of the wastegate valve known from WO 2013/098884 A1 is improved and also noise is reduced.

SUMMARY OF THE INVENTION

In the context of the present invention, it is acknowledged that engine vibration and pulsation cause the body member and the actuable member of a wastegate valve to move relative to each other. Although the movements concerned are very small, they result in wear in an axial direction of the wastegate valve, on the basis of which durability and eventually the functioning of the wastegate valve are compromised. In view thereof, it is an objective of the present invention to reduce wear in a wastegate valve that is of the type comprising a functional assembly of a body member and an actuable member. In a general sense, it is an objective of the present invention to reduce the extent to which engine vibration and pulsation affect durability and functionality of the wastegate valve.

Aspects of the present invention are set out in the accompanying independent and dependent claims. Features from the dependent claims may be combined with features from the respective independent claims as appropriate and not merely as explicitly set out in the claims and explained in the following description.

The present invention provides a wastegate valve comprising a functional assembly of a body member and an actuable member, wherein the body member has a sealing portion that is configured to rest on a seat for the wastegate valve in a closing position of the wastegate valve, wherein the actuable member is configured to provide an engagement area of the functional assembly and to thereby enable setting of the position of the wastegate valve through manipulation of the actuable member, and wherein at least one of surfaces of the body member and the actuable member facing each other in an axial direction of the wastegate valve is provided with at least one elevated portion delimited by at least one recessed portion in at least a tangential direction about the axial direction.

It follows from the above general definition of the wastegate valve according to the present invention that the invention provides a configuration in which at least one of surfaces of the body member and the actuable member facing each other in an axial direction of the wastegate valve is provided with at least one elevated portion delimited by at least one recessed portion in at least a tangential direction about the axial direction. Conventionally, the surfaces have a smooth appearance, whereas according to the present invention, at least one of the surfaces is provided with at least one elevated portion and at least one recessed portion. According to an insight of the present invention, it is achieved that when tiny particles detach from at least one of the body member and the actuable member under the influence of a relative movement of the body member and the actuable member and the abrasion effect on the surfaces involved, those tiny particles can be received in the at least one recessed portion so that effects of the presence of the particles on the constitution of the wastegate valve can be avoided.

In a practical embodiment of the wastegate valve according to the present invention, at least one recessed portion of the at least one of the surfaces of the body member and the actuable member facing each other in the axial direction extends in a substantially radial direction relative to the axial direction. In respect of the at least one recessed portion, it is further noted that the at least one recessed portion may have a generally straight appearance or a generally wavy appearance. In any case, in order to still have a sufficiently large contact area of the body member and the actuable member, it is advantageous if a width of the at least one recessed portion is small compared to a dimension of the at least one elevated portion in the tangential direction, i.e. if the at least one recessed portion is narrow.

In the context of the present invention, the number of elevated portions and recessed portions may be chosen freely. The number of both the elevated portions and the recessed portions may be exactly one, but it is also possible that the at least one of surfaces of the body member and the actuable member facing each other in the axial direction is provided with at least two elevated portions and at least two recessed portions. The elevated portions and the recessed portions may be provided in any suitable pattern.

As suggested earlier, the present invention relates to a wastegate valve that is of the type comprising a functional assembly of a body member and an actuable member. The body member and the actuable member may be of any suitable design. As is known in the field of wastegate valves, it is practical if a lever arm that is rotatably arranged about a lever axis outside of the wastegate valve is coupled to the actuable member.

A particular embodiment of the wastegate valve is feasible in which the body member comprises a horn-shaped element configured to extend through the seat for the wastegate valve in the closing position of the wastegate valve, and in which the sealing portion of the body member is arranged as a rim on the horn-shaped element. It is practical if the horn-shaped element is at least partially hollow and the actuable member is at least partially accommodated in the horn-shaped element. In such a case, it may be advantageous if an outside surface of the actuable member is configured to realize an enlarged contact area to an inside surface of the body member when a position of the actuable member in the body member changes from an initial ex-works position to an envisaged position following from wear to be expected during an initial use period of the wastegate valve. In other words, in such a case, it may be advantageous if an outside surface of the actuable member and an inside surface of the body member are designed to wear on each other in a period of initial use of the wastegate valve to thereby effectuate an even tighter coupling to each other and obtain stronger resistance against engine vibration and pulsation. This may be realized in various ways, including a) providing both the outside surface of the actuable member and the inside surface of the body member with a generally tapered appearance in the axial direction, as seen from the sealing portion of the body member to a free end of the horn-shaped element of the body member, and b) providing the outside surface of the actuable member with a generally convex spherical appearance and the inside surface of the body member with a generally concave spherical appearance.

According to an aspect of the present invention, the design of the wastegate valve complies with certain criteria aimed at obtaining advantageous wear behavior at the interface of the body member and the actuable member. One practical criterion may involve a ratio between a) a dimension of an area extending perpendicular to the axial direction and delimited by an inner perimeter of the sealing portion of the body member and b) a dimension of an area extending perpendicular to the axial direction and delimited by a perimeter of an area along which the body member and the actuable member are intended to contact each other at an inside position in the horn-shaped element after initial use of the wastegate valve. It is an insight of the present invention that it is advantageous if this ratio is at most 3.5, as this is related to maximizing a projected axial contact surface for wear reduction with respect to axial contact at a low level within the horn-shaped element for ensuring a proper sealing functionality of the wastegate valve throughout the lifetime of the wastegate valve. The indication of the area along which the body member and the actuable member are intended to contact each other after initial use of the wastegate valve is to be understood against the background of the wear to be expected during an initial use period of the wastegate valve, as mentioned earlier. It may be so that in practice, the area along which the body member and the actuable member contact each other inside the horn-shaped element increases, and it is the size of this area after the initial use period and the associated initial abrasion effect of the body member and the actuable member on each other that is taken into account in the definition of the ratio. The indication of a level of axial contact as low is to be understood against a background of a direction of movement of the wastegate valve for assuming the closing position.

BRIEF DESCRIPTION OF THE DRAWINGS

Further features and advantages of the present invention will become apparent from the description of the invention by way of exemplary and non-limiting embodiments of a wastegate valve.

The person skilled in the art will appreciate that the described embodiments of the wastegate valve according to the present invention are exemplary in nature only and not to be construed as limiting the scope of protection defined in the claims in any way. The person skilled in the art will realize that alternatives and equivalent embodiments of the wastegate valve can be conceived and reduced to practice without departing from the scope of protection of the present invention.

Reference will be made to the figures on the accompanying drawing sheets. The figures are schematic in nature and therefore not necessarily drawn to scale. Further, equal reference numerals denote equal or similar parts. On the attached drawing sheets.

DETAILED DESCRIPTION OF EMBODIMENTS

Figure 1:
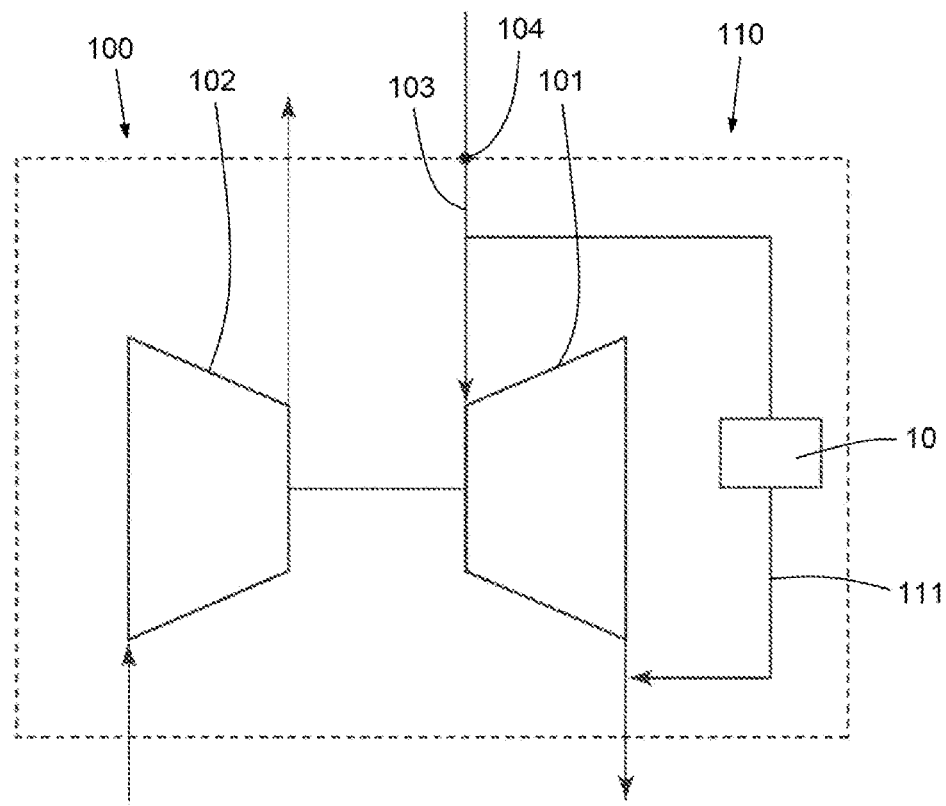
FIG. 1 is a block configuration diagram of a turbocharger according to an embodiment of the present invention, including a turbine, a compressor and a wastegate system.

In the figures, advantageous practical embodiments of a wastegate valve 10 according to the present invention are shown, which wastegate valve 10 comprises a functional assembly 11 of a body member 20 and an actuable member 30, and which wastegate valve 10 is intended to be used in a wastegate system 110 of a turbocharger 100 including a turbine 101 and a compressor 102. The wastegate valve 10 according to the present invention is designed in such a way that axial wear effects at the interface of the body member 20 and the actuable member 30 as a result of engine vibration and pulsation are limited, so that a durable wastegate valve 10 is obtained that is capable of performing its intended functionality of controlling an extent to which exhaust gas is allowed to flow to a bypass duct 111 of the wastegate system 110 throughout the lifetime of the wastegate valve 10. Details which are relevant in this respect will become apparent from the following. Generally speaking, a surface structure of at least one of surfaces of the body member 20 and the actuable member 30 facing each other in an axial direction A of the wastegate valve 10 is adjusted so as to provide one or more spaces for receiving tiny wear particles. During the manufacturing process of the wastegate valve 10, the surface structure may be realized in any suitable way, such as through debossing techniques or casting techniques followed by machine finishing. Further, in the context of an embodiment in which the body member comprises a horn-shaped element and in which a level of axial contact is low within the horn-shaped element, it is advantageous if axial contact can take place over a relatively large area.

With reference to FIG. 1, a short explanation of the general set-up of the turbocharger 100 and the wastegate system 110 is provided. The turbine 101 of the turbocharger 100 is configured to be rotated by exhaust gas of an engine (not shown), and the compressor 102 of the turbocharger 100 is configured to be driven by the turbine 101 to compress intake air for the engine. The turbocharger 100 further comprises an exhaust gas channel 103 and an exhaust gas inlet 104, wherein exhaust gas received from the engine is transported towards the turbine 101 through the exhaust gas channel 103 during operation of the turbocharger 100. In the wastegate system 110, the wastegate valve 10 serves to open and close the bypass duct 111 to the exhaust gas channel 103, wherein the bypass duct 111 is arranged to bypass the turbine 101, so that exhaust gas that is parted from the exhaust gas channel 103 bypasses the turbine 101 to be guided to a position downstream of the turbine 101.

Figure 2:
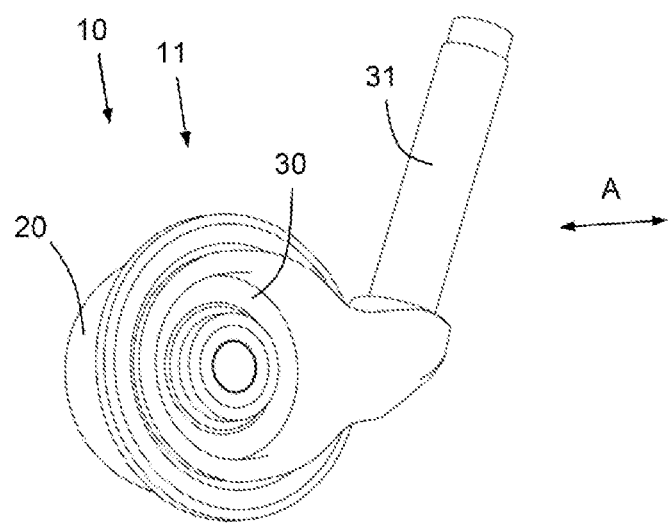
FIG. 2 diagrammatically shows a perspective view of a wastegate valve according to a first embodiment of the present invention, including a body member and an actuable member.
Figure 3:
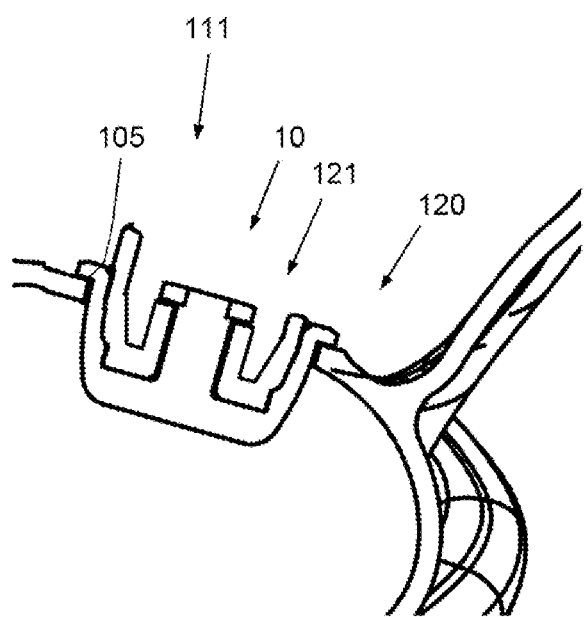
FIG. 3 illustrates a position of the wastegate valve in which the wastegate valve closes an access opening to a bypass duct bypassing the turbine.
Figure 4:
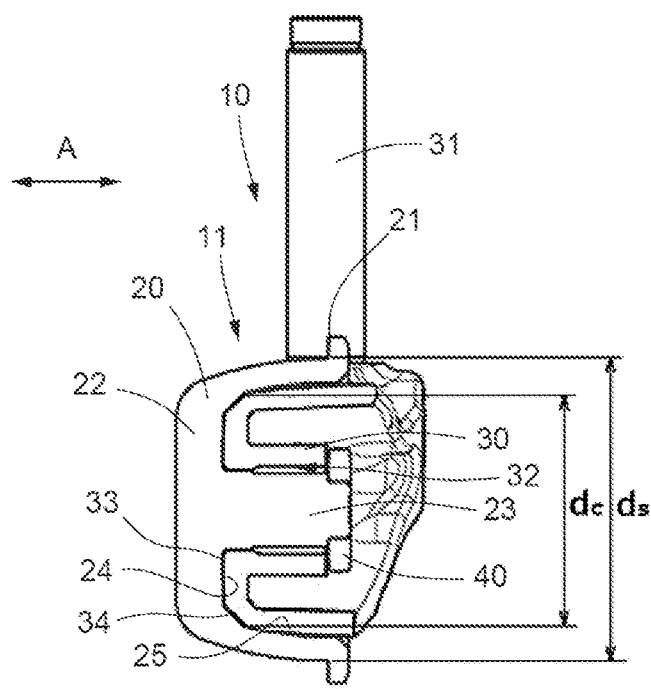
FIG. 4 diagrammatically shows a sectional view of the wastegate valve.

With reference to FIGS. 2, 3 and 4, it is noted that the body member 20 of the wastegate valve 10 has a sealing portion 21 that is configured to rest on a seat 105 for the wastegate valve 10 in a closing position of the wastegate valve 10 as illustrated in FIG. 3. The seat 105 is present at an appropriate position on a turbine housing 120 of the turbocharger 100, which appropriate position is such that when the wastegate valve 10 is in the closing position, all of the exhaust gas that enters the turbocharger 100 from the engine through the exhaust gas inlet 104 is allowed to flow to the turbine 101, and that when the wastegate valve 10 is in an opening position, part of the exhaust gas that enters the turbocharger 100 from the engine through the exhaust gas inlet 104 is made to bypass the turbine 101 through the bypass duct 111 so that not all of the exhaust gas is capable of reaching the turbine 101. In the context of the present invention, any suitable mechanism for moving the functional assembly 11 of the body member 20 and the actuable member 30 may be applied and any suitable way of controlling the position of the wastegate valve 10 is possible. The actuable member 30 is configured to provide an engagement area of the functional assembly 11, i.e. to provide an area where a mechanism for moving the functional assembly 11 may engage on the functional assembly 11, and to thereby enable setting of the position of the wastegate valve 10 through manipulation of the actuable member 30. In the shown example, the actuable member 30 is actuable by means of a lever arm 31 that is rotatably arranged about a lever axis outside of the wastegate valve 10 and that is coupled to the actuable member 30.

FIGS. 2, 3 and 4 show a wastegate valve 10 according to a first embodiment of the present invention. It can be seen that the body member 20 comprises a horn-shaped element 22 configured to extend through the seat 105 for the wastegate valve 10 in the closing position of the wastegate valve 10, and that the sealing portion 21 of the body member 20 is arranged as a rim on the horn-shaped element 22. The horn-shaped element 22 is partially hollow, and the actuable member 30 is partially accommodated in the horn-shaped element 22. In the shown example, the horn-shaped element 22 is generally cup-shaped and comprises a central protrusion 23 extending in the axial direction A, and the actuable member 30 has a central hole 32, wherein the central protrusion 23 of the horn-shaped element 22 extends through the actuable member 30 at the position of the central hole 32 thereof. Besides the body member 20 and the actuable member 30, the wastegate valve 10 comprises a washer element 40 that is arranged on the central protrusion 23 to lock the axial position of the actuable member 30 relative to the body member 20.

At a bottom position of the cup shape of the body member 20, surfaces 24, 33 of the body member 20 and the actuable member 30 face each other in the axial direction A. The interface of the surfaces 24, 33, which will hereinafter also be referred to as wear surfaces 24, 33, is a critical area in the wastegate valve 10, because in this area, an abrasion effect occurs under the influence of engine vibration and pulsation, and possibly other factors as well. During an initial use period of the wastegate valve 10, this causes a relatively high extent of wear of the wear surfaces 24, 33 until the surfaces 24, 33 have settled on each other, as it were. The design of the wastegate valve 10 may be chosen such that an initial ex-works contact area at the position of the wear surfaces 24, 33 is relatively small and gets enlarged as a result of the abrasion process during the initial use period. In the shown example, both the outside surface 34 of the actuable member 30 and the inside surface 25 of the body member 20 have a generally tapered appearance in the axial direction A, as seen from the sealing portion 21 of the body member 20 to a free, lowest end of the horn-shaped element 22 of the body member 20, so that the actuable member 30 can be displaced somewhat deeper into the body member 20 as a result of initial wear effects of the one member 20, 30 on the other 20, 30.

When the wastegate valve 10 is put from the closing position to the opening position, the sealing portion 21 of the body member 20 is moved away from the seat 105 and the horn-shaped element 22 is at least partially retracted through the access opening 121 that is present at the position of the seat 105 and that provides access to the bypass duct 111 from the exhaust gas channel 103. Air is allowed to pass the access opening 121 as long as the wastegate valve 10 is kept in the opening position. When the wastegate valve 10 is put from the opening position to the closing position, the horn-shaped element 22 is moved deeper through the opening access 121 until the sealing portion 21 abuts the seat 105 so that a sealing effect is obtained and a passage of air to the bypass duct 111 is disabled.

FIGS. 5, 6, 7 and 8 show a number of options in respect of a surface structure of the wear surface 24 of the body member 20 and/or the wear surface 33 of the actuable member 30. In general, the surface structure is such that the respective wear surface 24, 33 is provided with at least one elevated portion 26, 35 delimited by at least one recessed portion 27, 36 in at least a tangential direction T about the axial direction A. Tiny particles which are detached from at least one of the wear surfaces 24, 33 as a result of the abrasion effect can be received in the at least one recessed portion 27, 36, so that they can be kept at a position where they are harmless in the sense that they cannot cause any effect on the constitution of the wastegate valve 10 throughout the lifetime of the wastegate valve 10.

Figure 5:
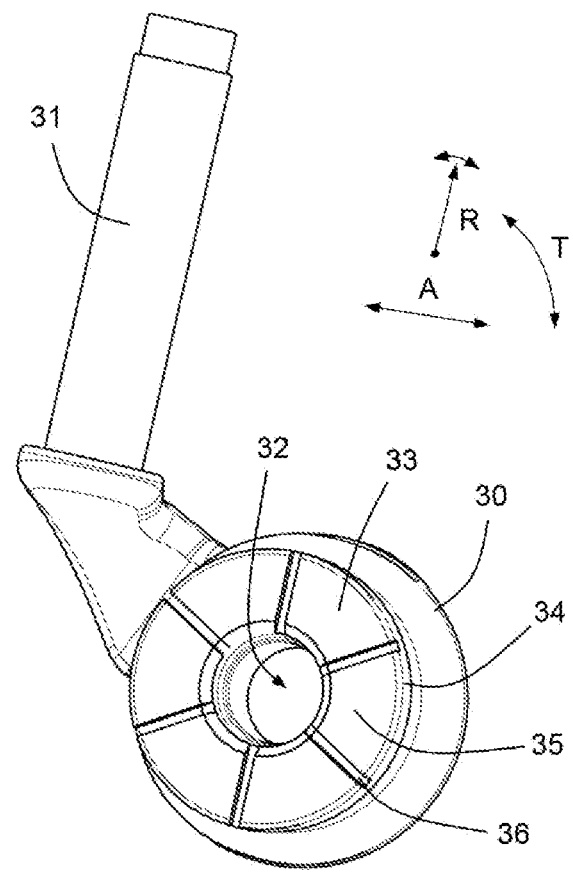
FIG. 5 illustrates an option of the actuable member being provided with a number of elevated portions and recessed portions at a side that is intended to face the body member in an axial direction of the wastegate valve, wherein the recessed portions have a generally straight appearance.
Figure 6:
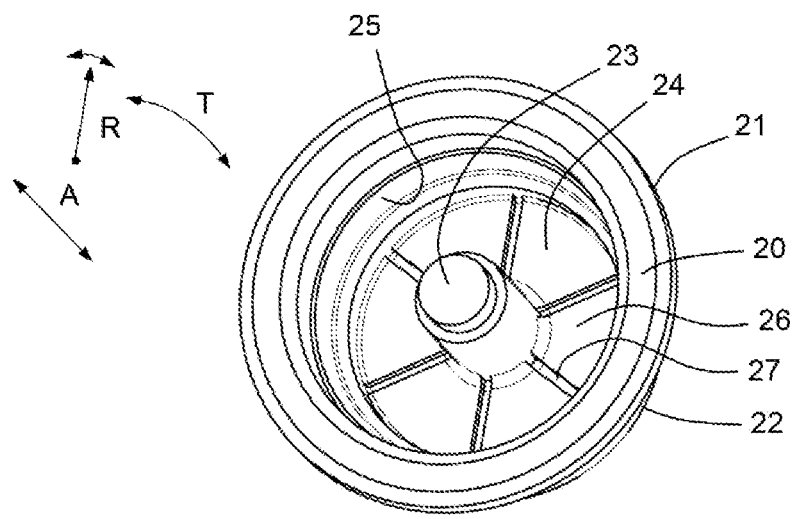
FIG. 6 illustrates an option of the body member being provided with a number of elevated portions and recessed portions at a side that is intended to face the actuable member in the axial direction, wherein the recessed portions have a generally straight appearance.
Figure 7:
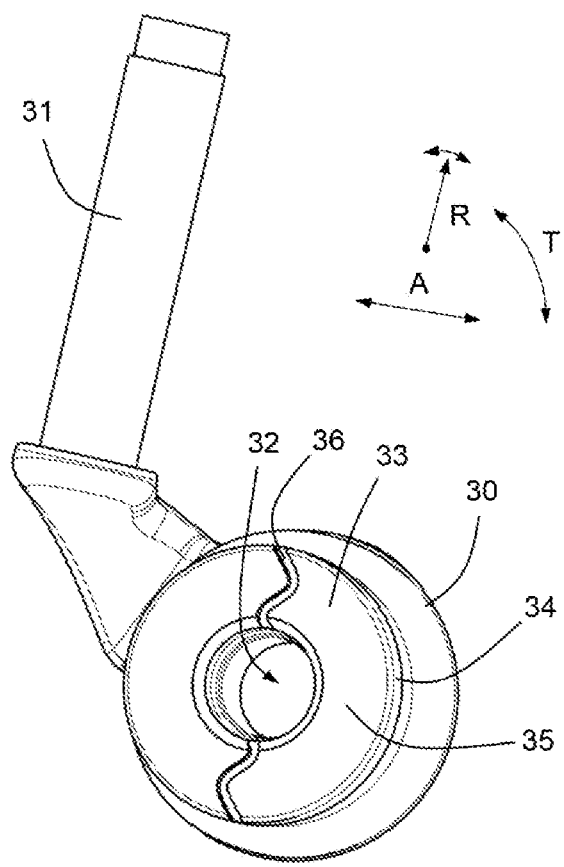
FIG. 7 illustrates an option of the actuable member being provided with a number of elevated portions and recessed portions at a side that is intended to face the body member in the axial direction, wherein the recessed portions have a generally wavy appearance.
Figure 8:
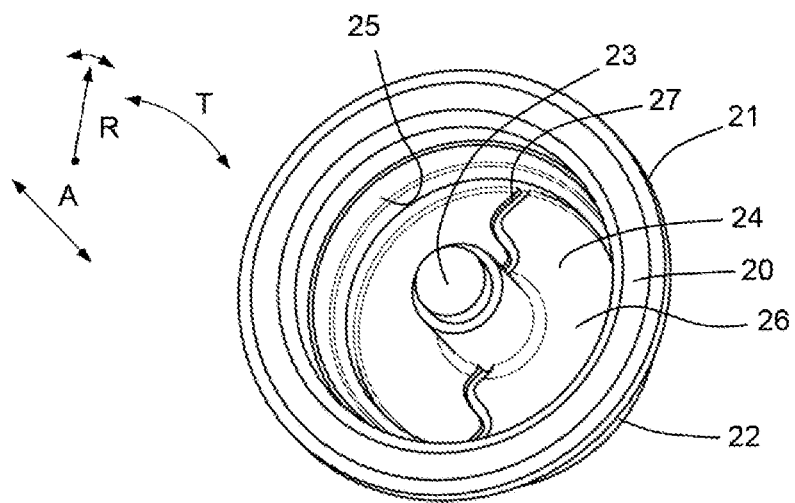
FIG. 8 illustrates an option of the body member being provided with a number of elevated portions and recessed portions at a side that is intended to face the actuable member in the axial direction, wherein the recessed portions have a generally wavy appearance.

The at least one recessed portion 27, 36 can be provided on one or both of the wear surfaces 24, 33. It is advantageous if the at least one recessed portion 27, 36 extends in a substantially radial direction R relative to the axial direction A, as shown in FIGS. 5, 6, 7 and 8. Further, the at least one recessed portion 27, 36 can have a generally straight appearance, as shown in FIGS. 5 and 6, or a generally wavy appearance, as shown in FIGS. 7 and 8. In the context of the present invention, the number of recessed portions 27, 36 can be chosen freely. In the case that the number is chosen so as to be one, a single elevated portion 26, 35 is obtained that spans almost the entirety of the respective wear surface 24, 33 in the tangential direction T. In the case that the number is chosen so as to be more than one, the same number of elevated portions 26, 35 may be obtained. In this respect, it is noted that FIGS. 5 and 6 relate to the option of the number of recessed portions 27, 36 being six, and that FIGS. 7 and 8 relate to the option of the number of recessed portions 27, 36 being two.

Figure 9:
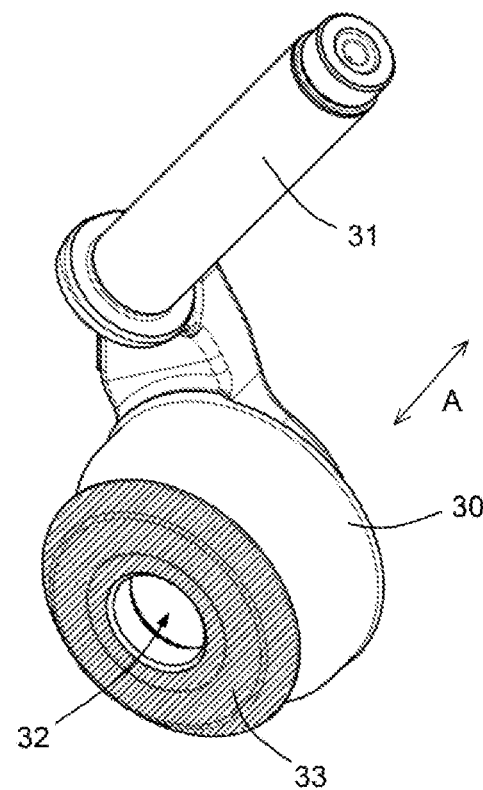
FIGS. 9 and 10 illustrate the size of wear surfaces of the body member and the actuable member intended to define a contact area between the body member and the actuable member after initial use of the wastegate valve.
Figure 10:
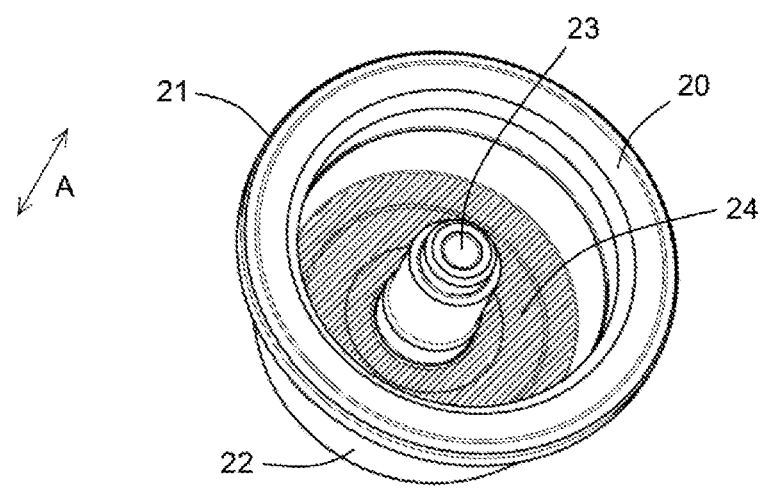

FIGS. 9 and 10 illustrate the size of the wear surfaces 24, 33 of the body member 20 and the actuable member 30 defining a contact area between the body member 20 and the actuable member 30 after initial use of the wastegate valve 10, wherein the wear surfaces 24, 33 are depicted in a hatched fashion, and wherein the elevated portions 26, 35 and the recessed portions 27, 36 are not shown for the sake of clarity. In the shown example, the wastegate valve 10 is designed such that a dimension of an area extending perpendicular to the axial direction A and delimited by a perimeter of the contact area at an inside position in the horn-shaped element 22 after initial use of the wastegate valve 10 is relatively large in comparison with a dimension of an area extending perpendicular to the axial direction A and delimited by an inner perimeter of the sealing portion 21 of the body member 20. A diameter of the first area is indicated as $d_c$ in FIG. 4, and a diameter of the second area is indicated as $d_s$ in FIG. 4. It is noted that in the shown example, both the first area and the second area have a circular periphery. This is not essential in the context of the invention; the fact is that the first area and the second area may be of any shape. Having the relatively large first area contributes to obtaining advantageous wear behaviour of the wear surfaces 24, 33 on each other, wherein a situation in which forces are concentrated on a relatively small area only is avoided. A ratio between the second area and the first area is preferably at most 3.5, in other words, the first area is preferably no more than 3.5 times smaller than the second area.

Figure 11:
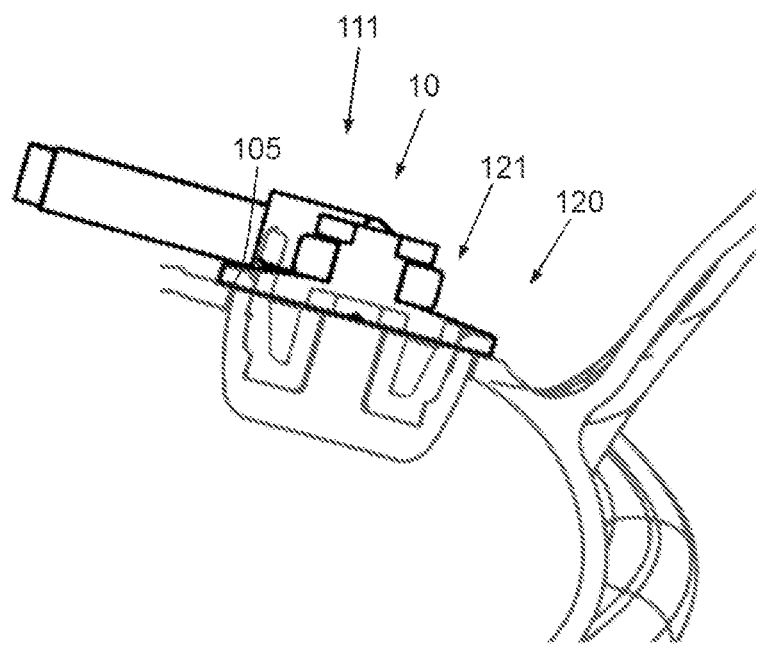
FIG. 11 illustrates the design of a wastegate valve according to a second embodiment of the present invention as compared to the design of the wastegate valve according to the first embodiment of the present invention.
Figure 12:
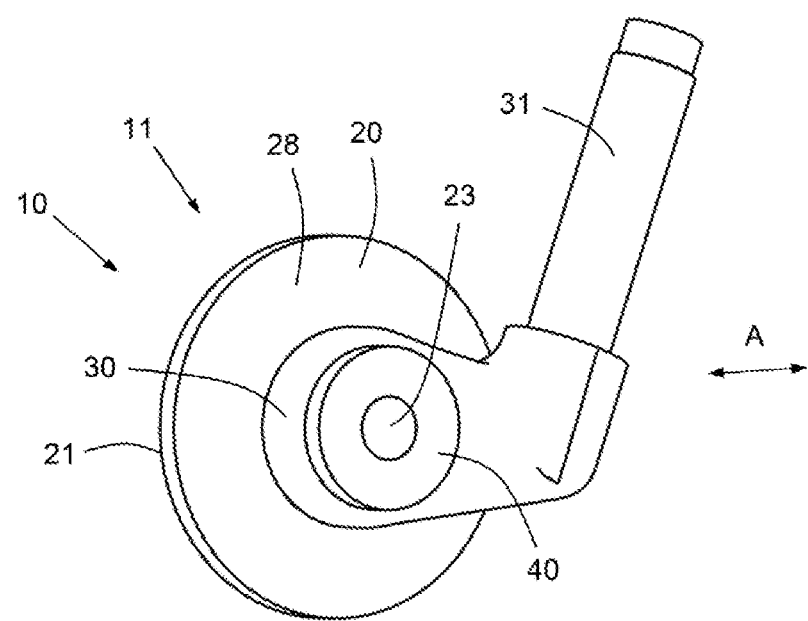
FIG. 12 diagrammatically shows a perspective view of the wastegate valve.
Figure 13:
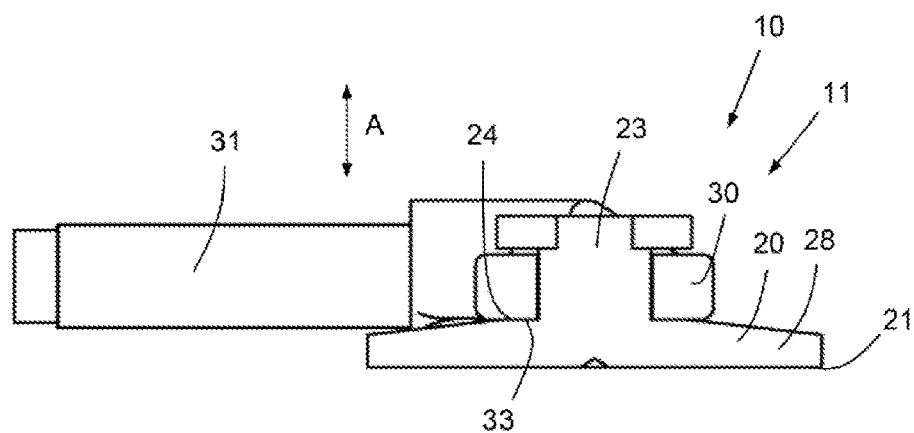
FIG. 13 diagrammatically shows a sectional view of the wastegate valve.

FIGS. 11, 12 and 13 show a wastegate valve 10 according to a second embodiment of the present invention. In FIG. 11, a comparison of the design of the wastegate valve 10 according to the second embodiment of the present invention, which will hereinafter also be referred to as second wastegate valve 10, to the design of the wastegate valve 10 according to the first embodiment of the present invention, which will hereinafter also be referred to as first wastegate valve 10, is shown. It can be seen that in the second wastegate valve 10, the body member 20 comprises a disc-like element 28 including the sealing portion 21 and a central protrusion 23. The actuable member 30 is generally ring-shaped and is arranged on the central protrusion 23 of the body member 20. As is the case in the first wastegate valve 10, a washer element 40 is arranged on the central protrusion 23 to lock the axial position of the actuable member 30 relative to the body member 20. Also, a lever arm 31 extends from the actuable member 30.

A first notable difference between the first wastegate valve 10 and the second wastegate valve 10 is that in the case of the first wastegate valve 10, a portion of the wastegate valve 10 actually extends through the access opening 121 when the wastegate valve 10 is in the closing position, whereas in the case of the second wastegate valve 10, there is nothing in the wastegate valve 10 that may pass the access opening 121. A second notable difference is that the wear surface 33 of the actuable member 30 faces the wear surface 24 of the body member 20 at a side of the disc-like element 28 that is opposite to a side of the disc-like element 28 at which the body member 20 contacts the seat 105 when the wastegate valve 10 is in the closing position.

Figure 14:
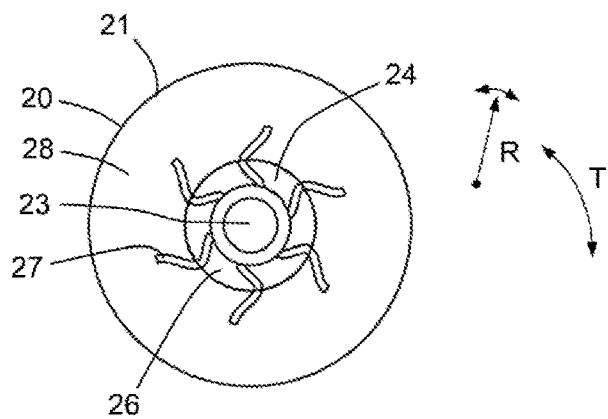
FIG. 14 illustrates an option of the body member being provided with a number of elevated portions and recessed portions at a side that is intended to face the actuable member in the axial direction, wherein the recessed portions have a generally straight appearance.
Figure 15:
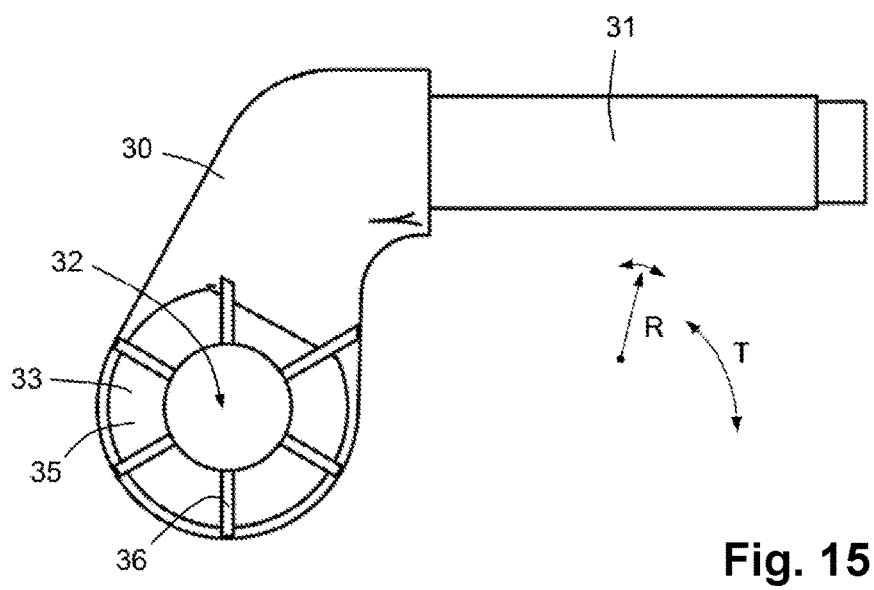
FIG. 15 illustrates an option of the actuable member being provided with a number of elevated portions and recessed portions at a side that is intended to face the body member in the axial direction, wherein the recessed portions have a generally straight appearance.

The concept of having at least one elevated portion 26, 35 delimited by at least one recessed portion 27, 36 in/on at least one of the wear surface 24 of the body member 20 and the wear surface 33 of the actuable member 30 is also applicable to the second wastegate valve 10. In this respect, FIG. 14 illustrates the option of the wear surface 24 of the body member 20 being provided with at least one elevated portion 26 and at least one recessed portion 27, and FIG. 15 illustrates the option of the wear surface 33 of the actuable member 30 being provided with at least one elevated portion 35 and at least one recessed portion 36.

It will be clear to a person skilled in the art that the scope of the present invention is not limited to the examples discussed in the foregoing but that several amendments and modifications thereof are possible without deviating from the scope of the present invention as defined by the attached claims. In particular, combinations of specific features of various aspects of the invention may be made. An aspect of the invention may be further advantageously enhanced by adding a feature that was described in relation to another aspect of the invention. While the present invention has been illustrated and described in detail in the figures and the description, such illustration and description are to be considered illustrative or exemplary only, and not restrictive.

The present invention is not limited to the disclosed embodiments. Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference numerals in the claims should not be construed as limiting the scope of the present invention.

Notable aspects of the present invention are summarized as follows. In the technical field of wastegate valves 10 comprising a functional assembly 11 of a body member 20 and an actuable member 30, measures are proposed to limit axial wear of the body member 20 and the actuable member 30 on each other as a result of engine vibration and pulsation. One of the measures involves a design of the wastegate valve 10 in which at least one of surfaces 24, 33 of the body member 20 and the actuable member 30 facing each other in an axial direction A of the wastegate valve 10 is provided with at least one elevated portion 26, 35 delimited by at least one recessed portion 27, 36 in at least a tangential direction T about the axial direction A. In this way, one or more spaces for receiving tiny wear particles from the interface between the body member 20 and the actuable member 30 are obtained, so that such particles cannot have an effect on the constitution of the wastegate valve 10.

REFERENCE LIST 100 turbocharger
101 turbine
102 compressor
103 exhaust gas channel
104 exhaust gas inlet
105 seat
110 wastegate system
111 bypass duct
120 turbine housing
121 access opening
10 wastegate valve
11 functional assembly
20 body member
21 sealing portion
22 horn-shaped element
23 central protrusion
24 wear surface
25 inside surface
26 elevated portion
27 recessed portion
28 disc-like element
30 actuable member
31 lever arm
32 central hole
33 wear surface
34 outside surface
35 elevated portion
36 recessed portion
washer element
$d_c$ diameter
$d_s$ diameter
A axial direction
R radial direction
T tangential direction

The invention claimed is:

1. A wastegate valve comprising a functional assembly of a body member and an actuable member,
wherein the body member has a sealing portion that is configured to rest on a seat for the wastegate valve in a closing position of the wastegate valve,
wherein the actuable member is configured to provide an engagement area of the functional assembly and to thereby enable setting of the position of the wastegate valve through manipulation of the actuable member,
wherein at least one of a surface of the body member and a surface of the actuable member facing each other in an axial direction of the wastegate valve,
wherein the at least one of the surface of the body member and the surface of the actuable member is provided at least one elevated portion formed adjacent to at least one recessed portion in a tangential direction of the wastegate valve,
wherein the body member comprises a horn-shaped element configured to extend through the seat for the wastegate valve in the closing position of the wastegate valve, and wherein the sealing portion of the body member is arranged as a rim on the horn-shaped element,
wherein the horn-shaped element is at least partially hollow, and wherein the actuable member is at least partially accommodated in the horn-shaped element,
wherein the horn-shaped element is cup-shaped and has a central protrusion extending from a bottom surface of horn-shaped element in the axial direction,
wherein the actuable member has a central hole through which the central projection is inserted,
wherein the surface of the body member is formed as the bottom surface of the horn-shaped element, and
wherein the surface of the actuable member is located within the horn-shaped element and is formed as a top surface of the actuable member in which the central hole is formed.

2. The wastegate valve according to claim 1, wherein at least one recessed portion extends in a substantially radial direction relative to the axial direction.

3. The wastegate valve according to claim 1, wherein the at least one recessed portion has a generally straight appearance.

4. The wastegate valve according to claim 1, wherein the at least one recessed portion has a generally wavy appearance.

5. The wastegate valve according to claim 1, wherein a width of the at least one recessed portion is small compared to a dimension of the at least one elevated portion in the tangential direction.

6. The wastegate valve according to claim 1, wherein the at least one of the surface of the body member and the surface of the actuable member facing each other in the axial direction is provided with at least two elevated portions and at least two recessed portions.

7. The wastegate valve according to claim 1, wherein both the outside surface of the actuable member and the inside surface of the body member have a generally tapered appearance in the axial direction, as seen from the sealing portion of the body member to a free end of the horn-shaped element of the body member.

8. The wastegate valve according to claim 1, wherein the outside surface of the actuable member has a generally convex spherical appearance and the inside surface of the body member (20) has a generally concave spherical appearance.

9. The wastegate valve according to claim 1, wherein a lever arm that is rotatably arranged about a lever axis outside of the wastegate valve is coupled to the actuable member.

10. A wastegate system of a turbocharger including a turbine and a compressor, and also an exhaust gas inlet, wherein the wastegate system comprises a bypass duct bypassing the turbine downstream of the exhaust gas inlet, which bypass duct is openable and closeable through a wastegate valve according to claim 1.

11. A turbocharger that is equipped with a wastegate system according to claim 10.

\* \* \* \* \*